United States Patent [19]

Preisler

[11] 4,295,964
[45] Oct. 20, 1981

[54] MOTORCYLE APPARATUS

[75] Inventor: James M. Preisler, Bloomington, Minn.

[73] Assignee: Thomas H. Rudd, Wayzata, Minn.

[21] Appl. No.: 118,021

[22] Filed: Feb. 4, 1980

[51] Int. Cl.³ .......................................... B01D 27/10
[52] U.S. Cl. .................................. 210/130; 210/168; 210/186; 224/39; 280/289 R
[58] Field of Search ............... 165/41; 180/54 A, 229; 184/104 B; 210/130, 131, 133, 168, 184, 186; 224/39; 280/289 R

[56] References Cited

U.S. PATENT DOCUMENTS

| | | | |
|---|---|---|---|
| 1,849,042 | 3/1932 | Pickard et al. | 210/186 X |
| 1,906,984 | 5/1933 | Lyman | 210/130 X |
| 1,963,945 | 6/1934 | Lyman et al. | 210/186 |
| 2,145,535 | 1/1939 | Vokes | 210/131 |
| 2,354,645 | 8/1944 | Bateman | 210/130 |
| 2,358,933 | 9/1944 | Lance | 210/186 |
| 2,432,475 | 12/1947 | Griffith | 210/186 |
| 2,460,888 | 2/1949 | Koinzan | 210/186 |
| 2,463,800 | 3/1949 | Pate | 210/134 |
| 2,468,866 | 5/1949 | Collier | 210/186 |
| 2,747,743 | 5/1956 | Talak | 210/130 |
| 2,781,859 | 2/1957 | Warren | 184/104 B |
| 2,801,006 | 7/1957 | Hultgren et al. | 210/133 |
| 3,187,896 | 6/1965 | Wilkinson | 210/130 |
| 3,572,509 | 3/1971 | Dexter | 210/130 |
| 4,171,729 | 10/1979 | Shibata | 165/41 X |
| 4,207,187 | 6/1980 | Booth | 210/130 |

Primary Examiner—Robert H. Spitzer
Attorney, Agent, or Firm—Wicks & Nemer

[57] ABSTRACT

Motorcycle apparatus is disclosed, in its preferred form, as a device for filtering and cooling oil including a novel and unique concealed mounting. The oil filtering and cooling device includes a casing having internal and external heat dissipating members for receiving and transferring heat from the oil, through the casing, to the outside ambient air or atmosphere. The internal heat dissipating members are shown in the preferred embodiment as including fins and shoulders which define an oil filter capturing cavity. An oil filter is biased inside the cavity by a spring which allows the oil to bypass the filter when the filter becomes clogged. The concealed mounting of the apparatus is accomplished by utilizing a mounting plate securable within an indentation formed in the back of the apparatus. Specifically, the mounting plate holds bolts outstanding from the apparatus through apertures in the mounting plate by capturing the heads of the bolts in apertures formed within the indentation of the apparatus. The bolts are securable to the motorcycle frame and especially to Harley-Davidson stock FX or XL frames.

19 Claims, 5 Drawing Figures

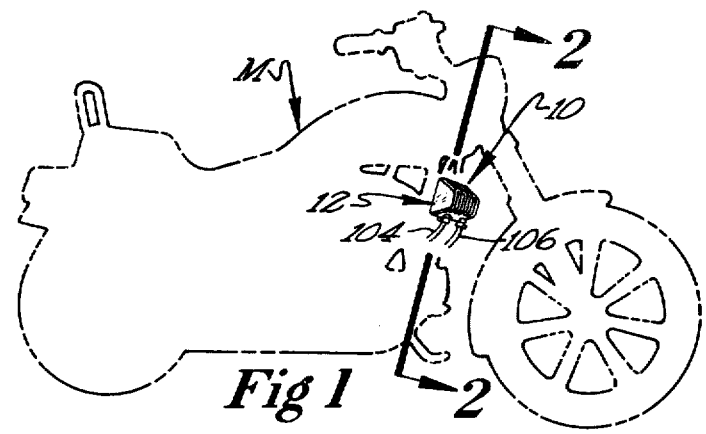
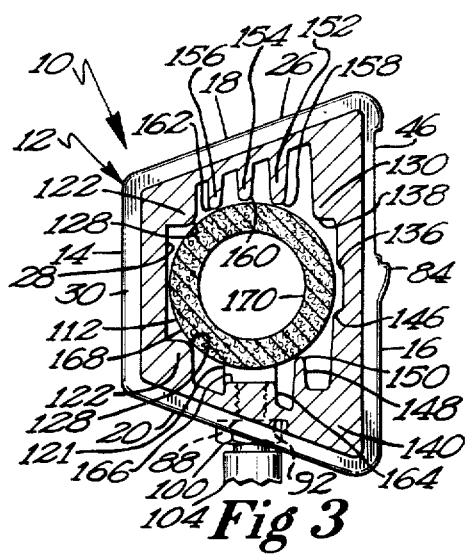
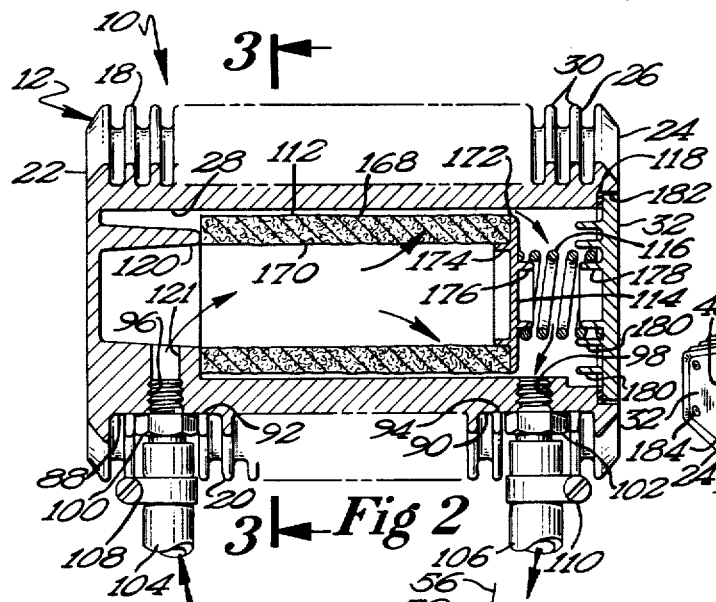
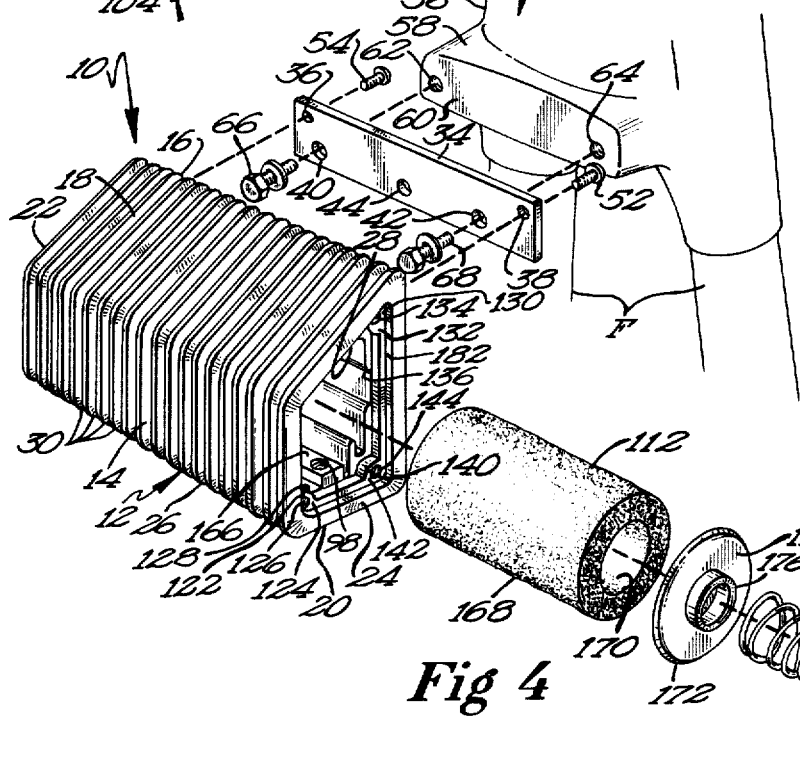
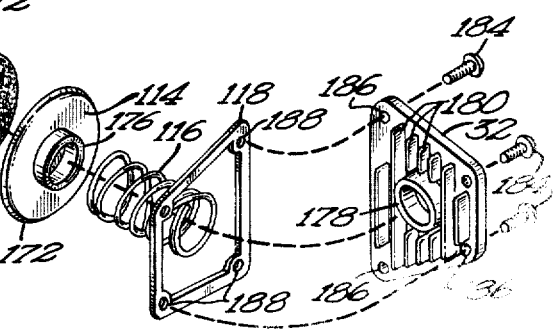

4,295,964

MOTORCYLE APPARATUS

BACKGROUND

This invention relates generally to motorcycle apparatus, and particularly to a device for filtering and cooling oil in a motorcycle and particularly to apparatus for mounting accessories to a motorcycle frame.

With the advent and increasing popularity of motorcycles, an increasing demand has arisen for motorcycle apparatus. Specifically, many prior motorcycles did not include any devices for filtering oil and those that did, included oil filtering devices which were very difficult and time consuming to maintain. Further, often, undesirable build up of motor heat occurred as a result of increasing oil heat arising from long operation. High engine heat is undesirable in that it decreases engine efficiency and increases motor wear.

Further, many components and accessories are located in the open on the motorcycle. Accessories and other optional equipment desired to be attached to the motorcycle often create an unappealing appearance and increase air resistance due to mounting techniques known prior to the present invention.

Thus, a need has arisen for a device for filtering and cooling oil which is very efficient in design, is very aesthetically appealing in an attached relationship with and to the motorcycle, is light in weight, and is easily serviceable. A further need has arisen for mounting apparatus for accessories and other optional equipment which is concealed and does not in any way conflict with the aesthetic appearance of the accessory in relationship to the motorcycle and does not in any way create air resistance above and beyond that created by the motorcycle and the accessory itself.

SUMMARY

The present invention solves the above and other problems of motorcycle apparatus by providing a device for filtering and cooling oil. In the preferred embodiment, the device includes a casing having internal and external heat dissipating members. The internal heat dissipating members terminate in and define an oil filter capturing cavity which receives an oil filter. The oil filter is biased but allows the oil to bypass the oil filter when the oil pressure inside the oil filter overcomes the bias.

Further, in the preferred embodiment, a mounting apparatus is shown including a mounting plate secured to the accessory and having at least a first aperture. A securable member including an elongated portion and an enlarged end is further provided. The elongated portion of the securable member outstands from the mounting plate through the aperture and the enlarged end of the securable member is captured to the back of the accessory within an aperture formed therein by the mounting plate.

Therefore, it is a primary object of the present invention to provide novel motorcycle apparatus.

It is also an object of this invention to provide novel apparatus for filtering and cooling oil.

It is also an object of this invention to provide novel apparatus for mounting an accessory to a motorcycle frame.

It is also an object of this invention to provide such novel mounting apparatus which is concealed.

It is also an object of this invention to provide such novel filtering and cooling device which allows ease of maintenance and replacement.

These and further objects and advantages of the present invention will become clearer in light of the following detailed description of an illustrative embodiment of this invention described in connection with the drawings.

DESCRIPTION OF THE DRAWINGS

The illustrative embodiments may best be described with reference to the accompanying drawings where:

FIG. 1 shows a perspective view of a device for filtering and cooling oil shown attached to a motorcycle illustrated in phantom, all according to the present invention.

FIG. 2 shows a cross sectional view of the oil filtering and cooling device of FIG. 1 according to Section Line 2—2 of FIG. 1.

FIG. 3 shows a cross sectional view of the oil filtering and cooling device of FIG. 1 according to Section Line 3—3 of FIG. 2.

FIG. 4 shows an exploded perspective view of the oil filtering and cooling device of FIG. 1 exploded from its mounting to a stock XL Harley Davidson motorcycle frame.

FIG. 5 shows a perspective view of the oil filtering and cooling device of FIG. 1 exploded from its mounting to a stock FX Harley Davidson motorcycle frame.

All figures are drawn for the ease of explanation of the basic teachings of the present invention only. Extensions of the figures with respect to number, position, relationship, and dimensions of the parts to form preferred embodiments will be explained or will be within the skill of the art after the teachings of the present invention have been read and understood.

Where used in the various figures of the drawings, the same numerals designate the same or similar parts in the oil filtering and cooling device and its mounting. Furthermore, when the terms "top", "bottom", "front", "back", "first", "second", "side", and similar terms are used herein, it should be understood that these terms have reference only to the structures shown in the drawings as it would appear to a person viewing the drawings and are utilized to facilitate describing the invention.

DESCRIPTION

In the figures, a device for filtering and cooling oil according to the teachings of the present invention is shown in unique connection and use with a motorcycle M and is generally designated 10. Device 10 includes a casing 12 having a front 14, a back 16, a top 18, a bottom 20, and first and second sides 22 and 24. Casing 12 includes an outside surface 26 and an inside surface 28 which defines the interior of casing 12.

A longitudinal cross section of casing 12 through front 14, back 16, top 18, and bottom 20 is in the form of a truncated triangle, and in the preferred embodiment, is in the form of an isosoles trapezoid. The latitudinal cross section of casing 12 through front 14, back 16, and sides 22 and 24 is in the form of a parallelogram, and, in the preferred embodiment, is in the form of a rectangle. The preferred shape of casing 12 assists desired air flow around device 10 as will be explained further hereinafter.

Outside surface 26 includes a series of fins 30 which extend longitudinally around front 14, back 16, top 18, and bottom 20. The series of fins 30 are then formed from first side 22 to second side 24. Outside surface 26 of first and second sides 22 and 24 is, in the preferred embodiment shown, smooth. Second side 24 includes a removable trap door 32 for allowing access to the interior of casing 12.

Device 10 further includes a unique mounting arrangement including mounting plate 34 with first, second, third, fourth, and fifth apertures 36, 38, 40, 42, and 44, respectively. An indentation 46 is formed in fins 30 formed on back 16 of a size and shape complementary to and for receiving mounting plate 34. The depth of indentation 46 in the preferred embodiment is approximately equal to the thickness of plate 34. Also, formed in casing 12 and within indentation 46 are first and second threaded apertures 48 and 50 for threadably receiving screws 52 and 54. Apertures 48 and 50 are in a complementary position and correspond to apertures 36 and 38 of plate 34. Screws 52 and 54 can be positioned through apertures 36 and 38 of plate 34 with their heads abutting against one side of plate 34 for attaching or securing plate 34 to back 16 of casing 12 within indentation 46.

Due to the preferred construction of casing 12 and mounting plate 34, the mounting of device 10 to a motorcycle frame is concealed thus giving the motorcycle M with device 10 a very pleasing aesthetic appearance. Further, because of the synergistic relationship between casing 12 and mounting plate 34, device 10 is adaptable for mounting on a variety of motorcycles and especially on Harley Davidson motorcycles, and particularly on Harley Davidson motorcycles having stock XL frames or strock FX frames. Furthermore, due to this concealed mounting, air flow around device 10 is not in any way restricted or blocked.

Specifically, as best seen in FIG. 4, the stock XL frame is shown and includes a cast member 56 having a mounting member 58 including an outwardly facing flat surface 60. Members are securable to member 58 of the motorcycle frame and include an elongated portion having an enlarged end, as shown in the preferred embodiment as bolts 66 and 68 which include a threaded shaft and a head. Lock washers may also be provided, as is conventional. First and second threaded apertures 62 and 64 are formed in surface 60 for receiving bolts 66 and 68. Tubular frame members F of motorcycle M then extend from cast member 56. Apertures 62 and 64 are in a complementary position and correspond to apertures 40 and 42 of plate 34. Thus, bolts 66 and 68 can be positioned through apertures 40 and 42 of plate 34 with their heads abutting against one side of plate 34 for attaching or securing plate 34 to surface 60 of member 58.

Third and fourth apertures 70 and 72 are further formed in casing 12 within indentation 46 in a complementary position and corresponding to apertures 40 and 42 of plate 34 and apertures 62 and 64 of surface 60 of member 58. Apertures 70 and 72 have a size and shape allowing receipt of the heads of bolts 66 and 68 and the preferred form have a size and shape allowing receipt of the heads of bolts 66 and 68 whatever the orientation of the heads of bolts 66 and 68. It should then be noted that apertures 70 and 72 are of the rotation allowing type and are shown as circular in the preferred embodiment.

It should then also be noted that plate 34 is of a size larger than surface 60 such that apertures 36 and 38 are exposed and extend beyond surface 60 of member 58 when plate 34 is attached to surface 60. In the preferred embodiment, apertures 36 and 38 are located in the corners of plate 34 to reduce the necessary size of plate 34 as much as possible within the other constraints of the present invention.

Thus, after plate 34 has been attached to surface 60 of member 58 by bolts 66 and 68, device 10 can be positioned such that plate 34 is located within indentation 46 of casing 12 and the heads of bolts 66 and 68 are located within apertures 70 and 72 of casing 12. At that time, screws 52 and 54 can be passed through yet exposed apertures 36 and 38 of plate 34 and threadably secured in apertures 48 and 50 of facing 12 to assemble the device 10 to motorcycle M. In an assembled relation, bolts 66 and 68 are outstanding from mounting plate 34 and extend through apertures 40 and 42 of mounting plate 34. Further, the heads of bolts 66 and 68 are captured and concealed within apertures 70 and 72 by plate 34.

It may now be seen and appreciated that device 10 according to the teachings of the present invention is indeed readily adaptable for mounting on a stock XL frame for a Harley Davidson motorcycle and the mounting is concealed to give motorcycle M with device 10 a very pleasing aesthetic appearance and to allow an unrestricted or unblocked air flow around device 10.

Furthermore, as best seen in FIG. 5, the stock FX frame is shown and includes a brace member 74 which extends between the tubular frame members F'. Brace member 74 then includes an aperture 76 therethrough. A member is securable to brace member 74 of the motorcycle frame and includes an elongated portion having an enlarged end, as shown in the preferred embodiment as bolt 78 which includes a threaded shaft and a head. Aperture 76 is in a complementary position and corresponds to aperture 44 of plate 34. Thus, bolt 78 can pass through aperture 44 of plate 34 and aperture 76 of brace 74.

A fifth aperture 80 is yet also formed in casing 12 within indentation 46 in a complementary position and corresponding to aperture 44 of plate 34 and aperture 76 of brace 74. Aperture 80 has a size and shape allowing receipt of the head of bolt 78 but preventing rotation of the head of bolt 78 within aperture 80, or in other words, aperture 80 is of the rotation restrictive type and is shown as hex shaped in the preferred embodiment. Casing 12 further includes dimples or abutting members 82 and 84 located below indentation 46 and on opposite sides of aperture 80.

In mounting device 10 to the stock FX frame of motorcycle M, the head of bolt 78 may be inserted into aperture 80. Plate 34 may then be positioned within indentation 46 with bolt 78 extending through aperture 44. Screws 52 and 54 can then be passed through apertures 36 and 38 of plate 34 and threadably secured in apertures 48 and 50 of casing 12. As can now be seen, the head of bolt 78 is captured and concealed within aperture 80 by plate 34 and is prevented from rotating in aperture 80 by the form of the aperture. Further, bolt 78 is outstanding from plate 34 and may extend through aperture 44 of plate 34. Device 10 may then be positioned such that bolt 78 extends through aperture 76 of brace 74. A nut 86 can then be threadably attached to bolt 78 for allowing bolt 78 to be securable to brace 74 of the motorcycle frame. Also conventional washers may be used. Since the rotation of bolt 78 is restricted by aperture 80, nut 86 may yet be tightened on bolt 78 for securing device 10 on brace 74. Members 82 and 84 then abut with brace 74 for providing, together with bolt 78, a three point connection for device 10 for preventing device 10 from turning or twisting about bolt 78.

It may now be also seen and appreciated that device 10 according to the teachings of the present invention is also indeed readily adaptable for mounting on a stock FX frame for a Harley Davidson motorcycle and the mounting is again concealed to give motorcycle M with device 10 a very pleasing aesthetic appearance and to allow an unrestricted or unblocked air flow around device 10.

First and second indentations 88 and 90 are formed in fins 30 of bottom 20 of casing 12. Ledges 92 and 94 extend at an angle from bottom 20 of casing 12 within indentations 88 and 90 in a direction generally perpendicular to the front 14 and back 16. Threaded apertures 96 and 98 extend perpendicularly from ledges 92 and 94 and parallel to front 14 and back 16 and terminate in the interior of casing 12. Suitable fittings 100 and 102 are threadably secured within apertures 96 and 98 and upon ledges 92 and 94. Oil hoses 104 and 106 may then be are attached to fittings 100 and 102 by clamps 108 and 110. Device 10 may then be located in the oil return line of motorcycle M and specifically hose 104 may be hydraulically connected to an oil pump and hose 106 may be hydraulically connected to an oil tank. Thus, aperture 98, fitting 102, and hose 106 may allow oil flow out of the interior of casing 12.

In the preferred embodiment, indentations 88 and 90 are rectangular in shape. Due to the rectangular shape of indentations 88 and 90 and due to ledges 92 and 94, fittings 100 and 102 can be tightened in apertures 96 and 98 by a standard wrench or by a socket wrench. Furthermore, ledges 92 and 94 assist in allowing casing 12 to be die cast and thus removed from a die cast mold during forming.

Device 10 further includes an oil filter 112, a spring retainer 114, a spring 116, and a gasket 118 for trap door 32.

Extending from side 22 into the interior of casing 12 is a well and oil filter seat member 120. Member 120 acts as a hydraulic reservoir and is hydraulically connected to aperture 96 by a passageway 121. Member 120 receives the oil flow from aperture 96 through passageway 121 thus preventing the oil flow from directly hitting filter 112 which may unduly wear filter 112 at the point of oil flow impact.

Shoulders 122 are formed in the corners between front 14 and top 18 between front 14 and bottom 20. Shoulders 122 extend from side 22 to a point adjacent to side 24 where they terminate in flat end 124 having threaded apertures 126 formed therein. Shoulders 122 include inner corners 128. A stair step shoulder 130 is formed in the corner of top 18 and back 16 and extends from side 22 to a point adjacent to side 24 where it terminates in a flat end 132 having threaded aperture 134 formed therein. Shoulder 130 includes a first step having a first corner 136 located adjacent the center of back 16 and a second step having a second corner 138. A second stair step shoulder 140 is formed in the corner of bottom 20 and back 16 and extends from side 22 to a point adjacent to side 24 where it terminates in a flat end 142 having a threaded aperture 144 formed therein. Shoulder 140 includes a first step having a first corner 146 located adjacent the center of back 16 but spaced from corner 136 of shoulder 130. In the preferred form, the first step of shoulder 140 is thicker than the first step of shoulder 130 such that corner 146 is located further inward than is corner 138. A heat dissipating fin 148 extends from the corner of the second stair step into the interior of casing 12 in a direction generally parallel to back 16 and terminates in a contact line 150. Fin 148 extends from side 22 to a point adjacent to side 24.

Heat dissipating fins 152, 154, and 156 extend from top 18 into the interior of casing 12 in a direction generally parallel to back 16 and extend from side 22 to a point adjacent side 24. Fins 152, 154, and 156 terminate in contact lines 158, 160, and 162, respectively.

A heat dissipating protrusion 164 extends from passageway 121 to a point adjacent to side 24 and extends into the interior from bottom 20 in a direction generally parallel to back 16. Protrusion 164 terminates in a rectangular shaped face 166 which is parallel to corners 128, 136, 138, and 146, and fins 148, 152, 154, and 156. The preferred shape of heat dissipating protrusion 164 allows the die cast molding of passageway 121 in the interior of casing 12. Aperture 98 then extends through protrusion 164.

Filter 112 is shown in the preferred embodiment as an original equipment manufactured oil filter and specifically a genuine AMF Harley Davidson filter element. Filter 112 has an exterior surface 168 which defines its shape and an interior surface 170 which defines the oil flow passageway. In the preferred embodiment, filter 112 is cylindrical in shape and includes first and second open ends. The oil flows from the oil flow passageway or the interior of filter 112, defined by surface 170, through the oil filter 112, i.e. from surface 170 to surface 168, and to the exterior of filter 112.

It should then be noted that corners 128, 136, and 146 of shoulders 122, 130 and 140, respectively, and contact lines 150, 158, 160, and 162 of fins 148, 152, 154, and 156, respectively, define an oil filter capturing cavity for receiving oil filter 112 on member 120 which is also located in the oil filter capturing cavity. While oil filter 112 is located in the oil filter capturing cavity, movement of filter 112 is substantially prevented by shoulders 122, 130 and 140 and fins 148, 152, 154, and 156 in all directions except longitudinally, or in other words, movement is substantially prevented except in directions generally parallel to front 14, back 16, top 18, and bottom 20 and perpendicularly to sides 22 and 24.

Spring retainer 114 includes a disk 172 of a shape corresponding to the cross section of filter 112 and includes an oil filter land 174 located on one side for receipt and positioning in inside surface 170 of filter 112 for closing the second open end of filter 112. Disk 172 further includes a spring land 176 located on its other side for receipt and positioning of spring 116.

Inside surface 28 of trap door 32 includes a spring land 178 for receipt and positioning of spring 116 and further includes heat dissipating fins 180 which extend around land 178. Heat dissipating fins 180, in addition to dissipating heat from the oil to trap door 32 for transfer to the atmosphere, reinforce door 32 and aid in preventing door 32 from warping to insure a proper gasket seal. Therefore, door 32 can be made of a lesser thickness and of less weight.

Casing 12 also includes a stair stepped portion 182 formed in end 24 for receipt of gasket 118 and trap door 32 such that door 32 is flush with end 24 when gasket 118 and door 32 are located therein. Door 32 is attached to casing 12 by screws 184 which extend through apertures 186 formed in door 32, through apertures 188 formed in gasket 118, and into threaded apertures 126, 134, and 144 formed in shoulders 122, 130, and 140, respectively.

In an assembled relation, the first open end of filter 112 seats with member 120. Spring 116 extends between spring retainer 114 and trap door 32 and thus biases filter 112 toward and on to member 120. Thus, aperture 96, fitting 100, hose 104, passageway 121, and member 120 allow oil flow to the interior or oil flow passageway of oil filter 112. In operation, oil flows from the oil pump to member 120, entering through hose 104, fitting 100, aperture 96, and passageway 121. Since the second or open end of oil filter 112 is closed by retainer 114, the oil must flow out of member 120 through filter 112. After the oil flows through filter 112, it flows around and along and is retarded by fins 148, 152, 154, and 156, shoulders 122, 130, and 140, and protrusion 164 such that heat from the oil is dissipated and transferred therethrough to casing 12. Heat received by casing 12 may then be dissipated and transferred to the atmosphere or air flow around device 10 by fins 30. Oil then flows out of the interior of casing 12 to the oil pan through aperture 98, fitting 102, and hose 106.

If oil filter 112 becomes clogged with sludge or other oil contaminants, the oil flow through filter 112 is restricted. Thus, the oil pressure within member 120 and the interior or oil flow passageway of oil filter 112 defined by surface 170 of filter 112 will increase or build up. When this built-up pressure within filter 112 and member 120 equals the bias of spring 116, the built-up pressure will tend to move oil filter 112 against spring 116. It has then been found that this pressure will raise filter 112 from member 120 and/or raise retainer 114 from the end of filter 112 allowing the oil to escape while bypassing filter 112.

Another subtle feature and advantage of the present invention may now be understood and appreciated. That is, device 10 of the present invention is especially adapted for manufacture by die casting. Specifically, it should be noted that fins 148, 152, 154, and 156, shoulders 122, 130, and 140, protrusion 164, and passageway 121 are formed parallel to front 14, back 16, top 18, and bottom 20, thus allowing formation by a mold core having a shape complimentary thereto. Furthermore, fins 148, 152, 154, and 156, shoulders 122, 130, and 140, and protrusion 164 and the spacing therebetween are relatively large to accommodate die casting. Specifically, no delicate parts are formed in casing 12 and thus casing 12 is easy to fabricate and is better able to stand up under heat. Furthermore, since the spacings between the components of casing 12 are large, the mold core used in forming the interior of casing 12 does not include any narrow, easily broken, or otherwise delicate parts which are subject to breakage upon mold core removal.

With the foregoing, yet another subtle feature and advantage of the present invention may now be understood and appreciated. That is, the specific design of device 10 assists air flow around device 10. Specifically, while the motorcycle M is being driven down the road, the air flow contacts front 14, and due to the preferred trapezoidal shape of casing 12 and the longitudinal arrangement of fins 30, air flows from front 14 to top 18 and bottom 20. It should then be noted that longitudinal fins 30 of the present invention have several advantages over latitudinal fins in that the air flow follows the longitudinal fins thus increasing its contact and heat transfer time. Whereas with latitudinal fins, the air must flow around the fins thus, air often does not flow into the crevices between the fins thus reducing the air flow contact and heat dissipating time. Furthermore, and as another advantage of the concealed mounting beyond aesthetics, the air flow is not in any way restricted or blocked over front 14, top 18 or bottom 20. Thus, the present invention has several advantages over many "universal" mounting structures which include clamps which encircle the filter element and thus restrict the air flow therearound.

The present invention also greatly reduces the time and effort necessary in replacing filter 112. Prior to the present invention, many motorcycles did not include oil filters or the filters were removed therefrom during customizing of the motorcycles. In other motorcycles, the oil filters are located in the oil tank, thus necessitating removal of portions of the motorcycle, such as the seat, for replacement. The present invention provides device 10 which is easily adaptable to such motorcycles for providing oil filtering or replacing existing oil filter structures. Further, in the present invention, device 10 is mounted exteriorly of the oil tank and filter 112 can be readily removed and replaced by simply removing bolts 184 which attach trap door 32 to casing 12. Also, the present device accomplishes all of its advantages in an aesthetic fashion.

Device 10 of the present invention has been found to reduce oil temperatures by up to 35° F. at cruising speeds. Also, a cover, not shown, can be provided for covering and shielding device 10 during operation in cold weather where the degree of oil cooling available using device 10 is not fully desired.

Now that the basic teachings of the present invention have been explained, many extensions and variations will be obvious to one having ordinary skill in the art. For example, although device 10 is especially adaptable for Harley Davidson motorcycles, it is adaptable for many other types of motorcycles.

Thus, since the invention disclosed herein may be embodied in other specific forms without departing from the spirit or the general characteristics thereof, some of which forms have been indicated, the embodiments described herein are to be considered in all respects to be illustrative and not restrictive. The scope of the invention is indicated by the appended claims rather than by the foregoing description and all changes that come within the meaning and equivalency of the claims are intended to be embraced therein.

What is claimed is:

1. Device for filtering and cooling oil for attachment to a motorcycle comprising, in combination: an oil filter having a shape and an oil flow passageway including at least one opening; a casing having an outside surface and an inside surface; internal heat dissipating members extending from the inside surface of the casing for retarding oil flow therearound and for receiving and transferring heat from the oil to the casing; external heat dissipating members extending from the outside surface of the casing for receiving and transferring heat from the casing to the atmosphere, with the internal heat dissipating members terminating in and defining an oil filter capturing cavity of a shape and size for receiving the oil filter; an oil filter seat member located within the oil filter capturing cavity of the casing for seating with the opening of the oil filter; first means for allowing oil flow into the oil flow passageway of the oil filter; second means for allowing oil flow out of the casing; and third means for biasing the oil filter toward the oil filter seat member and for allowing the oil to bypass the oil filter when the oil pressure inside the oil filter overcomes the biasing means thus causing the oil filter to unseat from the seat member and allow oil to escape from the opening in the oil filter, wherein the casing includes a front, a back, a top, a bottom, a first side, and a second side, wherein the first and second means are located in the bottom, wherein the internal heat dissipating members comprise, in combination: a first shoulder located in the corner between the front and the top; a second shoulder located in the corner between the front and the bottom; a third shoulder located in the corner between the bottom and the back; a fourth shoulder located in the corner between the top and the back, and wherein a longitudinal cross section of the casing through the front, back, top, and bottom is an isosceles trapezoid.

2. The device of claim 1 wherein the third and fourth shoulders are stair stepped and include first and second steps.

3. The device of claim 2 wherein the third shoulder includes a fin which extends from the corner of the second step in a direction generally parallel to the bottom.

4. The device of claim 1 wherein the internal heat dissipating members further comprise, in combination: heat dissipating fins which extend from the inside surface of the top of the casing.

5. The device of claim 1 wherein the external heat dissipating members comprise a series of fins which extend longitudinally around the casing around the front, the back, the top, and the bottom and formed from the first side to the second side.

6. The device of claim 5 wherein the device is attached to the motorcycle by means for mounting the device to the motorcycle in a concealed manner allowing an unrestricted air flow around the device and for providing a pleasant aesthetic appearance.

7. The device of claim 6 wherein the mounting means comprises, in combination: at least at first member securable to the motorcycle, with the securable member including an elongated portion having an enlarged end; a mounting plate having a shape; with the mounting plate including at least a first aperture having a size allowing the elongated portion of the securable member to pass therethrough but preventing the enlarged end of the securable member from passing therethrough; at least a first aperture formed in the casing and having a shape and size complementary to and for receiving the enlarged end of the securable member; and means for securing the mounting plate to the casing with the securable member outstanding from the mounting plate and extending through the mounting plate aperture and with the enlarged end captured within the casing aperture by the mounting plate.

8. Apparatus for mounting an accessory to a motorcycle frame, with the accessory including a back, comprising, in combination: at least a first member securable to the motorcycle frame, with the securable member including an elongated portion having an enlarged end; a mounting plate having a shape and a thickness, with the mounting plate including at least a first aperture having a size allowing the elongated portion of the securable member to pass therethrough but preventing the enlarged end of the securable member from passing therethrough; at least a first aperture formed in the back of the accessory and having a shape and size complementary to and for receiving the enlarged end of the securable member; means for securing the mounting plate to the back of the accessory with the securable member outstanding from the mounting plate and extending through the mounting plate aperture and with the enlarged end captured within the accessory aperture by the mounting plate; two abutting members located on opposite sides of the accessory aperture for providing a three point connection with the securable member for preventing the accessory from turning or twisting about the securable member.

9. The apparatus of claim 8 wherein the accessory aperture is of the rotation restriction type for preventing rotation of the enlarged end of the securable member within the accessory aperture.

10. The apparatus of claim 9 wherein the securable member is a bolt including a threaded shaft and a head.

11. The apparatus of claim 10 wherein the motorcycle frame includes a brace member having an aperture formed therein for receiving the bolt shaft, with the bolt being securable to the brace member of the motorcycle by a nut threadably attached to the bolt.

12. The apparatus of claim 9 further comprising, in combination: a second member securable to the motorcycle frame, with the second securable member including an elongated portion having an enlarged end, with the mounting plate further including a second aperture and a third aperture having sizes allowing the elongated portions of the first and second securable members to pass therethrough but preventing the enlarged ends of the securable members from passing therethrough; a second aperture formed in the back of the accessory and having a shape and size complementary to and for receiving the enlarged end of the first securable member; a third aperture formed in the back of the accessory having a shape and size complementary to and for receiving the enlarged end of the second securable member, with the first securable member outstanding from the mounting plate and extending through the second mounting plate aperture and with the enlarged end captured within the second accessory aperture by the mounting plate and with the second securable member outstanding from the mounting plate and extending through the third mounting plate aperture and with the enlarged end captured within the third accessory aperture by the mounting plate for allowing alternate mounting of the accessory by the first securable member extending through the first mounting plate aperture and with the enlarged end captured within the first accessory aperture or with the first securable member extending through the second mounting plate aperture and with the enlarged end captured within the second accessory aperture and with the second securable member outstanding from the mounting plate and extending through the third mounting plate aperture and with the enlarged end captured within the third accessory aperture.

13. Apparatus for mounting an accessory to a motorcycle frame, with the accessory including a back, comprising, in combination: at least a first member securable to the motorcycle frame, with the securable member including an elongated portion having an enlarged end; a mounting plate having a shape and a thickness, with the mounting plate including at least a first aperture having a size allowing the elongated portion of the securable member to pass therethrough but preventing the enlarged end of the securable member from passing therethrough; at least a first aperture formed in the back of the accessory and having a shape and size complementary to and for receiving the enlarged end of the securable member; means for securing the mounting plate to the back of the accessory with the securable member outstanding from the mounting plate and extending through the mounting plate aperture and with the enlarged end captured within the accessory aperture by the mounting plate; a second member securable to the motorcycle frame, with the second securable member including an elongated portion having an enlarged end, with the mounting plate including a second aperture having a size allowing the elongated portion of the second securable member to pass therethrough but preventing the enlarged end of the second securable member from passing therethrough; a second aperture formed in the back of the accessory and having a shape and size complementary to and for receiving the enlarged end of the second securable member; with the securing means allowing the second securable member to outstand from the mounting plate and to extend through the second mounting plate aperture and with the enlarged end captured within the second accessory aperture by the mounting plate.

14. The apparatus of claim 13 wherein the accessory aperture is of the rotation allowing type allowing rotation of the enlarged end of the securable member therein.

15. The apparatus of claim 13 or 14 wherein the securable members are bolts having a threaded shaft and a head.

16. The apparatus of claim 15 wherein the motorcycle frame includes a mounting member having first and second threadable apertures for threadably receiving the first and second securable members allowing the mounting plate to be attached to the mounting member of the motorcycle frame by the first and second securable members and then allowing the attachment of the accessory to the mounting plate by the securing means with the enlarged ends of the securable members being located in the first and second accessory apertures.

17. Apparatus for mounting an accessory to a motorcycle frame, with the accessory including a back, comprising, in combination: at least a first member securable to the motorcycle frame, with the securable member including an elongated portion having an enlarged end; a mounting plate having a shape and a thickness, with the mounting plate including at least a first aperture having a size allowing the elongated portion of the securable member to pass therethrough but preventing the enlarged end of the securable member from passing therethrough; at least a first aperture formed in the back of the accessory and having a shape and size complementary to and for receiving the enlarged end of the securable member; means for securing the mounting plate to the back of the accessory with the securable member outstanding from the mounting plate and extending through the mounting plate aperture and with the enlarged end captured within the accessory aperture by the mounting plate, wherein the mounting plate securing means comprises, in combination: first and second screws having a threaded shaft and a head, with the mounting plate including fourth and fifth apertures having a size allowing the threaded shaft of the screws to pass therethrough but preventing the head of the screws from passing therethrough; and fourth and fifth apertures formed in the back of the accessory, with the screws being threadably secured into the fourth and fifth apertures of the accessory for capturing the mounting plate between the back of the accessory and the heads of the screws.

18. Apparatus for mounting an accessory to a motorcycle frame, with the accessory including a back, comprising, in combination: at least a first member securable to the motorcycle frame, with the securable member including an elongated portion having an enlarged end; a mounting plate having a shape and a thickness, with the mounting plate including at least a first aperture having a size allowing the elongated portion of the securable member to pass therethrough but preventing the enlarged end of the securable member from passing therethrough; at least a first aperture formed in the back of the accessory and having a shape and size complementary to and for receiving the enlarged end of the securable member; means for securing the mounting plate to the back of the accessory with the securable member outstanding from the mounting plate and extending through the mounting plate aperture and with the enlarged end captured within the accessory aperture by the mounting plate; an indentation formed in the back of the accessory having a shape complementary to and adapted for receiving the mounting plate, with the accessory apertures being formed within the indentation allowing the mounting plate to be flush with the back of the accessory.

19. Apparatus for mounting an accessory to a motorcycle frame, with the accessory including a back, comprising, in combination: at least a first member securable to the motorcycle frame, with the securable member including an elongated portion having an enlarged end; a mounting plate having a shape and a thickness, with the mounting plate including at least a first aperture having a size allowing the elongated portion of the securable member to pass therethrough but preventing the enlarged end of the securable member from passing therethrough; at least a first aperture formed in the back of the accessory and having a shape and size complementary to and for receiving the enlarged end of the securable member; means for securing the mounting plate to the back of the accessory with the securable member outstanding from the mounting plate and extending through the mounting plate aperture and with the enlarged end captured within the accessory aperture by the mounting plate, wherein the accessory aperture is of the rotation restriction type for preventing rotation of the enlarged end of the securable member within the accessory aperture; a second member securable to the motorcycle frame, with the second securable member including an elongated portion having an enlarged end, with the mounting plate further including a second aperture and a third aperture having sizes allowing the elongated portions of the first and second securable members to pass therethrough but preventing the enlarged ends of the securable members from passing therethrough; a second aperture formed in the back of the accessory and having a shape and size complementary to and for receiving the enlarged end of the first securable member; a third aperture formed in the back of the accessory having a shape and size complementary to and for receiving the enlarged end of the second securable member, with the first securable member outstanding from the mounting plate and extending through the second mounting plate aperture and with the enlarged end captured within the second accessory aperture by the mounting plate and with the second securable member outstanding from the mounting plate and extending through the third mounting plate aperture and with the enlarged end captured within the third accessory aperture by the mounting plate for allowing alternate mounting of the accessory by the first securable member extending through the first mounting plate aperture and with the enlarged end captured within the first accessory aperture or with the first securable member extending through the second mounting plate aperture and with the enlarged end captured within the second accessory aperture and with the second securable member outstanding from the mounting plate and extending through the third mounting plate aperture and with the enlarged end captured within the third accessory aperture.

* * * * *